US012412294B2

(12) United States Patent
Chew et al.

(10) Patent No.: US 12,412,294 B2
(45) Date of Patent: Sep. 9, 2025

(54) SYSTEM, A DETECTION SYSTEM FOR DETECTING A FOREIGN OBJECT ON A RUNWAY AND A METHOD OF THE SYSTEM

(71) Applicants: Rong-Jie David Chew, Singapore (SG); Rong-Qi Phoebe Chew, Singapore (SG)

(72) Inventors: Rong-Jie David Chew, Singapore (SG); Rong-Qi Phoebe Chew, Singapore (SG)

(*) Notice: Subject to any disclaimer, the term of this patent is extended or adjusted under 35 U.S.C. 154(b) by 345 days.

(21) Appl. No.: 18/030,056

(22) PCT Filed: Oct. 1, 2021

(86) PCT No.: PCT/SG2021/050598
§ 371 (c)(1),
(2) Date: Apr. 3, 2023

(87) PCT Pub. No.: WO2022/071891
PCT Pub. Date: Apr. 7, 2022

(65) Prior Publication Data
US 2023/0360247 A1 Nov. 9, 2023

(30) Foreign Application Priority Data

Oct. 1, 2020 (SG) .......................... 10202009789R

(51) Int. Cl.
*G06K 9/00* (2022.01)
*G06T 7/11* (2017.01)
*G06T 7/62* (2017.01)
*G06T 7/70* (2017.01)
*G06V 10/10* (2022.01)
*G06V 10/25* (2022.01)
*G06V 20/52* (2022.01)

(52) U.S. Cl.
CPC .................. *G06T 7/70* (2017.01); *G06T 7/11* (2017.01); *G06T 7/62* (2017.01); *G06V 10/16* (2022.01);
(Continued)

(58) Field of Classification Search
CPC . G06T 2207/30232; G06T 2207/10048; G06T 7/11; G06T 7/62; G06T 7/70;
(Continued)

(56) References Cited

U.S. PATENT DOCUMENTS 9,830,506 B2 * 11/2017 Short .................... G06V 40/172
10,228,460 B1  3/2019 Jinkins
(Continued)

FOREIGN PATENT DOCUMENTS

CN  109784214 A  5/2019
KR  101852058 B1  4/2018

OTHER PUBLICATIONS

International Search Report and Written Opinion prepared by the ISA/AU for International Application No. PCT/SG2021/050598; 12 pages; mailed Dec. 13, 2021; in English.
(Continued)

*Primary Examiner* — Hadi Akhavannik
(74) *Attorney, Agent, or Firm* — Martin & Ferraro, LLP

(57) ABSTRACT

The present invention relates to a system for detecting a foreign object on a runway. The system includes a thermal camera having a first field of view and adapted to capture a thermal image of an area of interest on the runway, a visible light camera having a second field of view and adapted to capture a visible light image of the area of interest on the runway, such that the first field of view overlaps the second field of view. The system further includes a processor configured to detect a thermal object image in the thermal image, detect a visible light object image in the visible light image, and determine that the foreign object is detected when the thermal object image and the visible light object image are detected in the thermal image and the visible light image respectively.

23 Claims, 10 Drawing Sheets

(51) Int. Cl.
  *G08G 5/21* (2025.01)
  *G08G 5/54* (2025.01)
  *H04N 23/11* (2023.01)
  *H04N 23/23* (2023.01)
(52) U.S. Cl.
  CPC .............. *G06V 10/25* (2022.01); *G06V 20/52* (2022.01); *G08G 5/21* (2025.01); *G08G 5/54* (2025.01); *H04N 23/11* (2023.01); *H04N 23/23* (2023.01); *G06T 2207/10048* (2013.01); *G06T 2207/30232* (2013.01); *G06V 2201/07* (2022.01)
(58) Field of Classification Search
  CPC ............. G06T 17/00; G06T 2200/08; G06T 2207/10012; G06T 2207/10024; G06T 2207/10028; G06T 2207/20021; G06T 2207/30244; G06T 7/12; G06T 7/593; G06V 20/52; G06V 2201/07; G06V 10/22
  See application file for complete search history.

(56) References Cited

U.S. PATENT DOCUMENTS

| | | |
|---|---|---|
| 2005/0007386 A1 | 1/2005 | Berson |
| 2008/0036576 A1* | 2/2008 | Stein ...................... G06V 20/58 340/425.5 |
| 2010/0045809 A1* | 2/2010 | Packard ................. H04N 23/45 348/E5.022 |
| 2010/0231705 A1 | 9/2010 | Yahav |
| 2010/0309315 A1 | 12/2010 | Hogasten |
| 2011/0063445 A1 | 3/2011 | Chew |
| 2013/0329052 A1 | 12/2013 | Chew |
| 2016/0110630 A1* | 4/2016 | Heusch ................ G06T 7/0004 382/160 |
| 2019/0354772 A1 | 11/2019 | Tasli |
| 2020/0126248 A1 | 4/2020 | Nitzan |
| 2020/0283163 A1 | 9/2020 | Blom |
| 2023/0419845 A1 | 12/2023 | Chew |

OTHER PUBLICATIONS

International Preliminary Report on Patentability prepared by the IPEA/AU for International Application No. PCT/SG2021/050598; 18 pages; mailed Nov. 28, 2022; in English.

Extended European Search Report dated Jun. 21, 2024 for co-pending European Application No. 21876113.8; 6 pages.

Knyaz Vladimir: "Recognition of low-resolution objects in remote sensing images", SPIE Proceedings;. [Proceedings of SPIE ISSN 0277-786X] I SPIE, US, vol. 11155, Oct. 7, 2019 (Oct. 7, 2019), pp. 111551X-111551X, XP060126244, DOI: 10.1117/12.2533315 ISBN: 978-1-5106-3673-6.

* cited by examiner

SYSTEM, A DETECTION SYSTEM FOR DETECTING A FOREIGN OBJECT ON A RUNWAY AND A METHOD OF THE SYSTEM

CROSS-REFERENCE TO RELATED APPLICATIONS

This is a National Phase Application under 35 USC 371 of International Application No. PCT/SG2021/050598 filed Oct. 1, 2021, which claims priority to Singapore Application No. 10202009789R filed Oct. 1, 2020, all of which are incorporated by reference herein in their entirety.

TECHNICAL FIELD

The present invention relates to a system, a detection system for detecting a foreign object on a runway and a method of the system.

BACKGROUND

Foreign objects and debris (FOD) on an airport runway pose a hazard to aircraft landing and taking-off thereon. There are FOD detection systems using visible light spectrum cameras to perform reliable FOD detection under normal clear weather conditions. Under normal clear weather conditions, e.g. in the absence of any fog, the FOD detection system will be able to capture high resolution images of any FOD and process them for the detection of the FOD with high accuracy. FOD may include engine and aircraft parts, tools, construction debris, rubber materials, natural materials, etc.

However, during adverse weather conditions, especially under foggy weather conditions, the performance of the FOD detection system could be adversely impacted and compromised. The FOD detection system may not be able to reliably detect an FOD under foggy weather conditions, i.e. poor visibility conditions, as it operates only in the visible light spectrum. Hence, it will not be able to "see" the FOD under such conditions, e.g. through fog, which typically reduces visibility along the runway to less than 1 km. The visibility conditions may be categorised into different categories. For example, Cat II represents standard operations with associated Runway Visual Range (RVR) ranging from 550 m (1,800 feet) to 300 m (1,000 feet), Cat IIIa represents a precision instrument approach and landing operation with RVR not less than 175 m (600 feet), Cat IIIb represents a precision instrument approach and landing operation with RVR less than 175 m (600 feet) but not less than 50 m (200 feet), Cat IIIc represents a precision instrument approach and landing operation with no RVR limitations, i.e. even zero visibility. Depending on the geographical location of the airports, the visibility of the runways at airports may vary and are categorised accordingly. While most FOD detection systems are able to detect FOD for airports with Cat II visibility, they are not able to be used for airport that experience Cat IIIa, Cat IIIb and Cat IIIc visibility.

Further, the FOD detection system often generates invalid alerts or false positive alarms. The invalid alerts may be due to some phenomena, mainly light reflections, e.g. from artificial light sources originating from nearby buildings or runway edge lights, etc. These artificial lights reflecting off the smooth runway surface or reflecting off water puddles or ponding on the runway surface may cause the FOD detection system to identify it as a FOD and hence result in invalid alerts. The number of such invalid alerts due to reflections would typically increase significantly after a rainfall when water puddles or ponding are prevalent on the runway pavement surface. Though such reflections do occur during the daytime, they are much more prevalent at night and during the periods of dawn and dusk of the day.

Therefore, it is important to provide a solution that enables the detection of FOD during poor visibility conditions, e.g. adverse weather conditions, and prevent or minimise false detection of the FOD.

SUMMARY

According to various embodiments, a method for detecting a foreign object on a runway is provided. The method includes capturing a thermal image of an area of interest on the runway, capturing a visible light image of the area of interest on the runway, detecting a thermal object image in the thermal image, detecting a visible light object image in the visible light image, and determining that the foreign object is detected when the thermal object image and the visible light object image are detected in the thermal image and the visible light object image respectively.

According to various embodiments, determining the foreign object may include generating at least one attribute of the foreign object in each of the thermal object image and visible light object image, comparing the at least one attribute of the foreign object in the thermal object image and the visible light object image, such that the foreign object is detected when the at least one attribute of the foreign object in thermal object image and the visible light object image are the same.

According to various embodiments, the at least one attribute of the foreign object may include the position of the thermal object image in the thermal image and the position of the visible light object image in the visible light image.

According to various embodiments, the at least one attribute of the foreign object in thermal object image and the visible light object image are the same when the distance between the position of the thermal object image in the thermal image and the position of the visible light object image in the visible light image is within a position parameter.

According to various embodiments, the at least one attribute of the foreign object may include the size of the thermal object image and visible light object image.

According to various embodiments, the at least one attribute of the foreign object in the thermal object image and visible light object image are the same when the difference in the size of the thermal object image in the thermal image and the size of the visible light object image in the visible light image is within a size parameter.

According to various embodiments, the method may further include obtaining an enlarged thermal object image and an enlarged visible light object image when the foreign object is detected.

According to various embodiments, the method may further include identifying an object category of the foreign object in the thermal image, such that identifying the object category may include, segmenting the thermal image into a plurality of thermal image regions, assigning a feature vector to each of the plurality of thermal image regions, comparing the feature vector to a plurality of reference feature vectors, such that each of the plurality of reference feature vectors represents an object category, identifying the reference feature vector closest to the feature vector and its object category.

According to various embodiments, segmenting the thermal image may include labelling each pixel in the thermal image and grouping the labelled pixels with the same characteristic into a plurality of groups to form the plurality of thermal image regions.

According to various embodiments, the method may further include identifying an object category of the foreign object in the visible light image, such that identifying the object category may include, segmenting the visible light image into a plurality of visible light image regions, assigning a feature vector to each of the plurality of visible light image regions, comparing the feature vector to a plurality of reference feature vectors, such that each of the plurality of reference feature vectors represents an object category, and identifying the reference feature vector closest to the feature vector and its object category.

According to various embodiments, segmenting the visible light image may include labelling each pixel in the visible light image and grouping the labelled pixels with the same characteristic into a plurality of groups to form the plurality of visible light image regions.

According to various embodiments, the method may further include training the thermal camera to detect the foreign object based on the visible light images from the visible light camera.

According to various embodiments, training the thermal camera may include determining a relationship between the object category of the foreign object in the visible light image and the temperature of the foreign object in the thermal image.

According to various embodiments, a system for detecting a foreign object on a runway is provided. The system includes a thermal camera having a first field of view and adapted to capture a thermal image of an area of interest on the runway, a visible light camera having a second field of view and adapted to capture a visible light image of the area of interest on the runway, such that the first field of view overlaps the second field of view. The system further includes a processor in communication with the thermal camera and the visible light camera, a memory in communication with the processor for storing instructions executable by the processor, such that the processor is configured to detect a thermal object image in the thermal image, detect a visible light object image in the visible light image, and determine that the foreign object is detected when the thermal object image and the visible light object image are detected in the thermal image and the visible light object image respectively.

According to various embodiments, to determine the foreign object, the processor may be configured to generate at least one attribute of the foreign object in each of the thermal object image and visible light object image, compare the at least one attribute of the foreign object in the thermal object image and the visible light object image, such that the foreign object is detected when the at least one attribute of the foreign object in thermal object image and the visible light object image are the same.

According to various embodiments, the at least one attribute of the foreign object may include the position of the thermal object image in the thermal image and the position of the visible light object image in the visible light image.

According to various embodiments, the at least one attribute of the foreign object in thermal object image and the visible light object image are the same when the distance between the position of the thermal object image in the thermal image and the position of the visible light object image in the visible light image is within a position parameter.

According to various embodiments, the at least one attribute of the foreign object may include the size of the thermal object image and visible light object image.

According to various embodiments, the at least one attribute of the foreign object in the thermal object image and visible light object image are the same when the difference in the size of the thermal object image in the thermal image and the size of the visible light object image in the visible light image is within a size parameter.

According to various embodiments, the processor may be further configured to zoom in the thermal camera and visible light camera to obtain an enlarged thermal object image and an enlarged visible light object image when the foreign object is detected.

According to various embodiments, the processor may be configured to identify an object category of the foreign object in the thermal image, such that the processor may be configured to, segment the thermal image into a plurality of thermal image regions, assign a feature vector to each of the plurality of thermal image regions, compare the feature vector to a plurality of reference feature vectors, such that each of the plurality of reference feature vectors represents an object category, identify the reference feature vector closest to the feature vector and its object category.

According to various embodiments, to segment the thermal image, the processor may be configured to label each pixel in the thermal image and group the labelled pixels with the same characteristic into a plurality of groups to form the plurality of thermal image regions.

According to various embodiments, the processor may be further configured to identify an object category of the foreign object in the visible light image, such that the processor may be configured to, segment the visible light image into a plurality of visible light image regions, assign a feature vector to each of the plurality of visible light image regions, compare the feature vector to a plurality of reference feature vectors, such that each of the plurality of reference feature vectors represents an object category, identify the reference feature vector closest to the feature vector and its object category.

According to various embodiments, to segment the visible light image, the processor may be configured to label each pixel in the visible light image and group the labelled pixels with the same characteristic into a plurality of groups to form the plurality of visible light image regions.

According to various embodiments, the processor may be further configured to train the thermal camera to detect the foreign object based on the visible light images from the visible light camera.

According to various embodiments, to train the thermal camera, the processor may be configured to determine a relationship between the object category of the foreign object in the visible light image and the temperature of the foreign object in the thermal image.

According to various embodiments, a detection system for detecting a foreign object on a runway divided into a plurality of sectors is provided, the detection system includes a plurality of sets of cameras spaced apart from each other, each of the plurality of sets of cameras may include a thermal camera includes a first field of view and adapted to capture a thermal image of an area of interest on the runway, a visible light camera includes a second field of view and adapted to capture a visible light image of the area of interest on the runway, such that the first field of view overlaps the second field of view, a processor in communication with the thermal camera and the visible light camera, a memory in communication with the processor for storing instructions executable by the processor, such that the processor may be configured to detect a thermal object image in the thermal image, detect a visible light object image in the visible light image, and determine that the foreign object is detected when the thermal object image and the visible light object image are detected in the thermal image and the visible light object image respectively, such that each of the plurality of sets of cameras may be configured to scan one of the plurality of sectors of the runway.

DETAILED DESCRIPTION

In the following examples, reference will be made to the figures, in which identical features are designated with like numerals.

Figure 1:
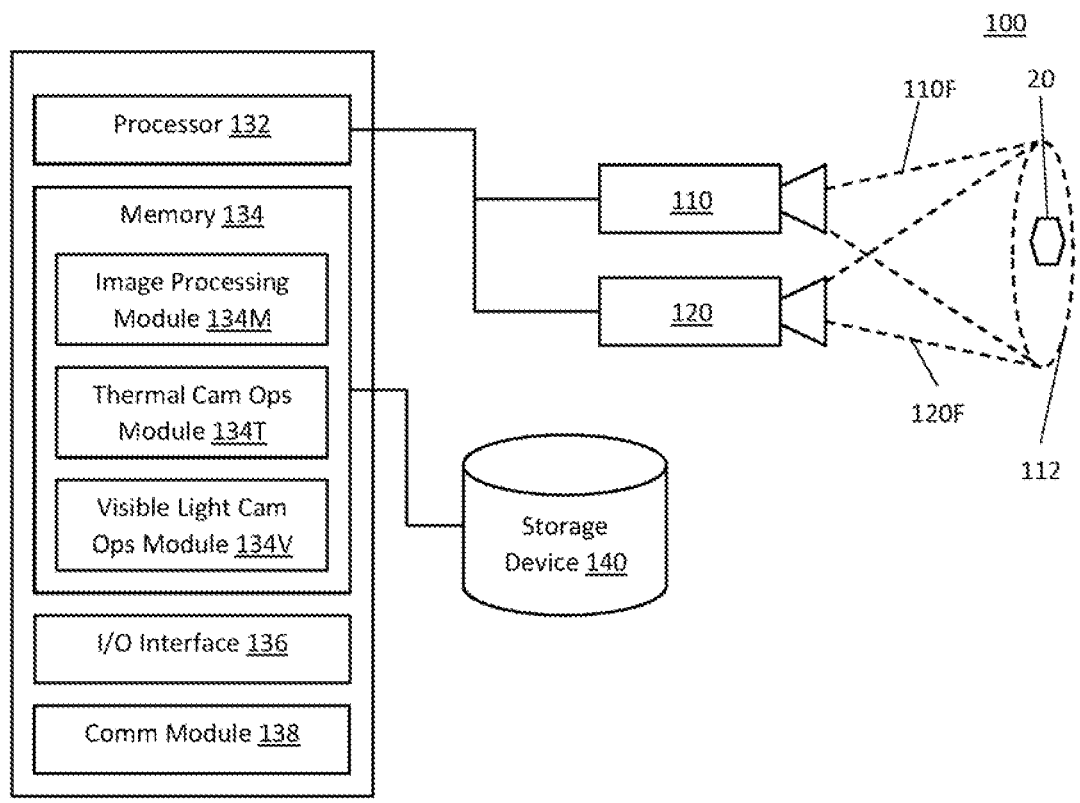
FIG. 1 shows a schematic diagram of an exemplary embodiment of a system for detecting a foreign object on a runway.

FIG. 1 shows a schematic diagram of an exemplary embodiment of a system 100 for detecting a foreign object 20 on a runway. System 100 includes a thermal camera 110 having a first field of view 110F and adapted to capture a thermal image 110M of an area of interest 112 on the runway, a visible light camera 120 having a second field of view 120F and adapted to capture a visible light image of the area of interest 112 on the runway, such that the first field of view 110F overlaps the second field of view 120F, a processor 132 in communication with the thermal camera 110M and the visible light camera 120M, a memory 134 in communication with the processor 132 for storing instructions executable by the processor 132, such that the processor 132 is configured to detect a thermal object image in the thermal image, detect a visible light object image in the visible light image, and determine that the foreign object 20 is detected when the thermal object image and the visible light object image are detected in the thermal image and the visible light object image respectively. System 100 may include a server comprising the processor 132, the memory 134, an I/O interface 136 configured to provide an interface between the processor 132 and peripheral interface modules, e.g. keyboard, mouse, touchscreen, display, etc. System 100 may include a communication module 138 configured to facilitate communication, wired or wirelessly, between the system 100 and other user devices, e.g. mobile devices, laptops, via the internet. System 100 may include a storage device 140 configured to store data. System 100 may include a display, e.g. monitor, touchscreen, for displaying signals, e.g. alert signal, to the operator. System 100 is configured to detect a foreign object, debris (FOD), on a runway, a taxiway, aprons, ramps, etc. under both day and night ambient light condition without assisted illumination, e.g. visible spectrum illumination, infrared illumination, laser illumination.

Figure 1A:
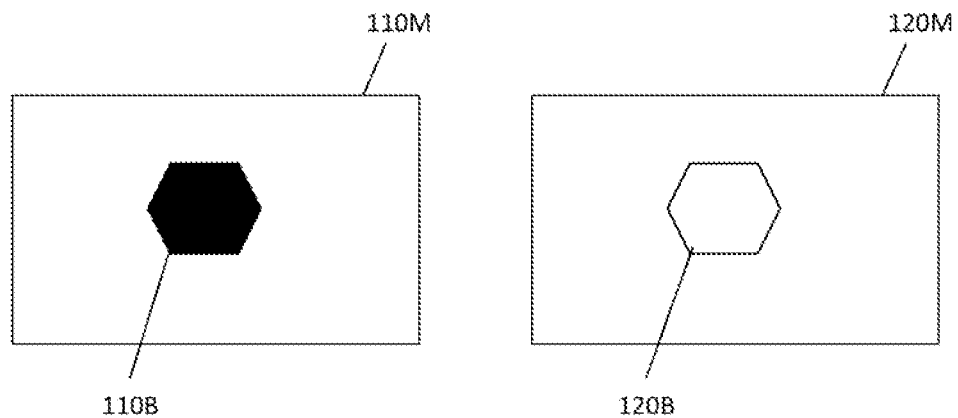
FIG. 1A shows a schematic diagram of the visible light image with the visible light object image of the foreign object therein and the thermal image with the thermal object image of the foreign object therein.

FIG. 1A shows a schematic diagram of the visible light image 120M with the visible light object image 120B of the foreign object 20 therein and the thermal image 110M with the thermal object image 110B of the foreign object 20 therein.

System 100 may include an image processing module 134M (see FIG. 1) configured to process images 110T, 120T captured from the thermal camera 110 and visible light camera 120. System 100 may include a thermal camera operating module 134T containing operating parameters of the thermal camera 110 for operating the thermal camera 110. System 100 may include a visible light camera operating module 134V containing operating parameters of the visible light camera 120 for operating the visible light camera 120. The modules 134T, 134V, 134M may be stored in the storage device 140 and loaded into the memory 134 to be processed by the processor 132.

Upon capturing the thermal image 110M and visible light image 120M, the images 110M, 120M may be transmitted to the processor 132 to be processed. Processor 132 may receive and process the thermal image 110M and the visible light image 120M to detect a foreign object 20 on the runway. System 100 enables detection of a foreign object 20 for airports with Cat II visibility, Cat IIIa visibility, Cat IIIb visibility and Cat IIIc visibility, such that it enables the detection of foreign object during poor visibility conditions, e.g. adverse weather conditions, and prevent or minimise false detection of the foreign object.

Figure 2A:
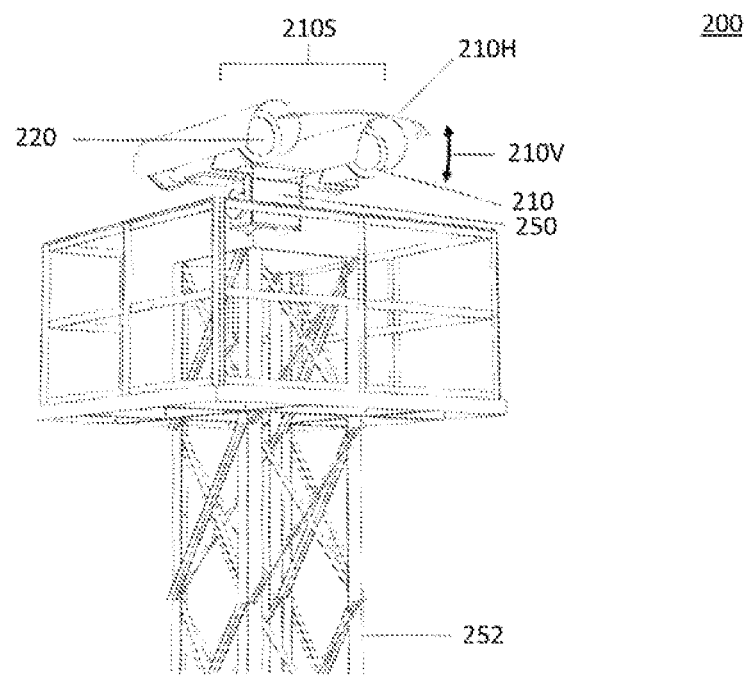
FIG. 2A shows an exemplary embodiment of the system.

FIG. 2A shows an exemplary embodiment of the system 200. System 200 may include a set of cameras, i.e. the visible light camera 220 and the thermal camera 210. The set of cameras 210S may be mounted rigidly on an actuator 250 adapted to move the set of cameras 210S. Set of cameras 210S may be controlled by the processor 132 to scan a sector of the runway to detect the foreign object 20 on the surface of the runway.

Actuator 250 may be a pan and tilt unit (PTU) adapted to pan and tilt the set of cameras 210S simultaneously so that the set of cameras 210S are able to have the same field of view and focus on the same area of interest. Actuator 250 may be adapted to pan the set of cameras 210S in the horizontal direction 210H and/or tilt the set of cameras 210S in the vertical direction 210V. Actuator 250 may be in communication with the processor 132 such that the processor 132 may be configured to remotely control the movement of the actuator 250 to pan and tilt the set of cameras 210S to scan the runway. Actuator 250 may be installed on top of a support 252, e.g. a mast structure, which is typically located along the runway. Support may be located at distance of 120 m-350 m from the centreline 304 (see FIG. 3) of the runway.

Figure 2B:
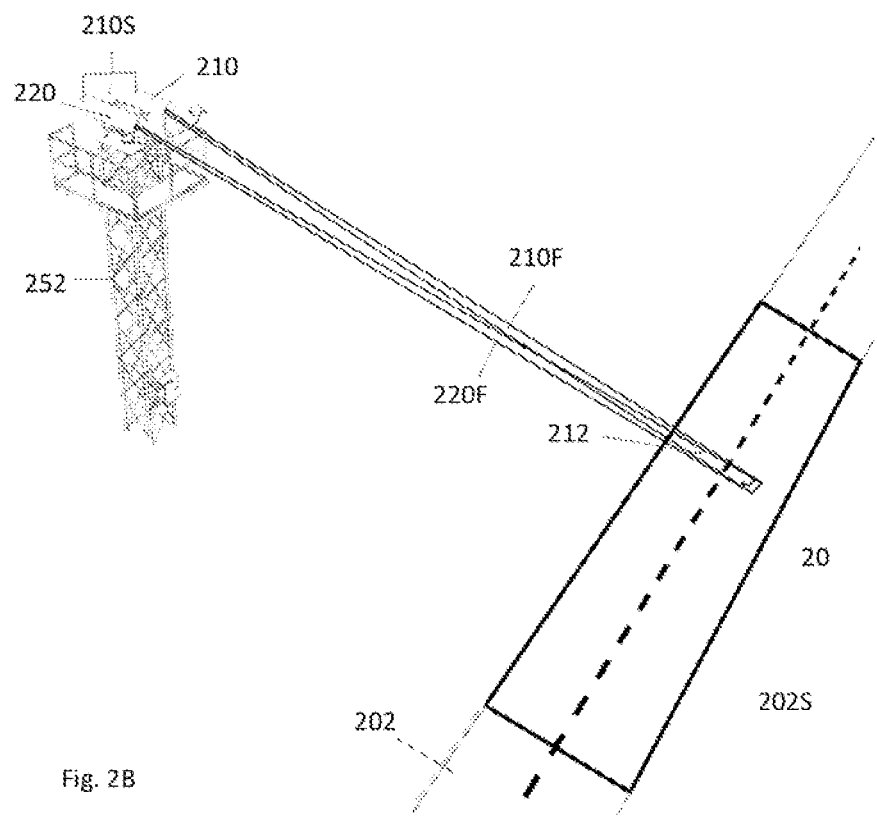
FIG. 2B shows the system in FIG. 2A scanning one of the plurality of sectors of the runway.

FIG. 2B shows the system 100 in FIG. 2A scanning one of the plurality of sectors 202S of the runway 202. Each set of cameras 210S may include the thermal camera 210 and the visible light camera 220, each having a field of view 210F, 220F and is adapted to capture an area of interest 212. Field of view 210F of the visible light camera 220 may overlap with the field of view 220F of the thermal camera 210. Both the field of views 210F, 220F of the visible light camera 220 and the thermal camera 210 may cover a specific area of interest 212 within the sector 202S of the runway 202. Hence, as a result of the overlapping field of views 210F, 220F, both the visible light camera 220 and the thermal camera 210 may detect the same foreign object 20 on the sector 202S of the runway at the same time while scanning the sector 202S.

Figure 3:
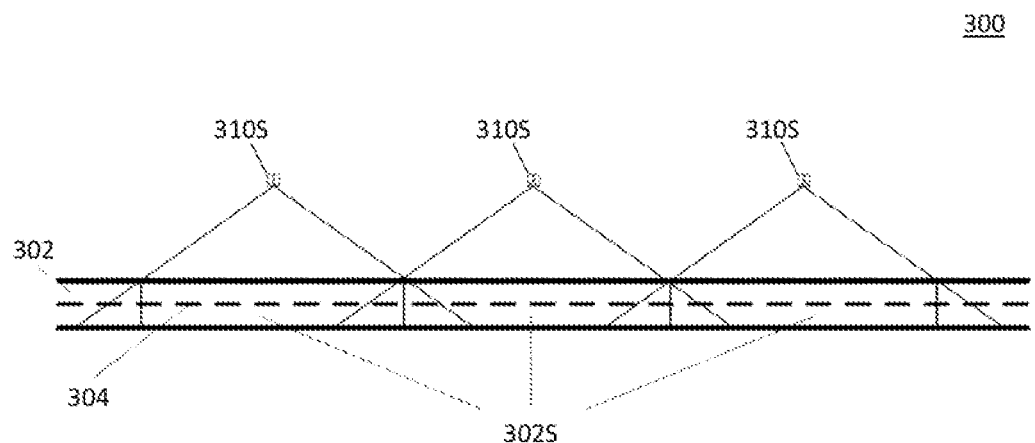
FIG. 3 shows an exemplary embodiment of a detection system for detecting a foreign object on a runway divided into a plurality of sectors.

FIG. 3 shows an exemplary embodiment of a detection system 300 for detecting a foreign object 20 on a runway 302 divided into a plurality of sectors 302S. Detection system 300 includes a plurality of sets of cameras 310S spaced apart from each other. Each of the plurality of sets of cameras 310S includes a thermal camera 210 having a first field of view 210F and adapted to capture a thermal image 110M of an area of interest 212 on the runway 302, a visible light camera 220 having a second field of view 220F and adapted to capture a visible light image 120M of area of interest 212 on the runway 302, such that the first field of view 210F overlaps the second field of view 220F. Detection system 300 further includes a processor, a memory in communication with the processor for storing instructions executable by the processor, such that the processor is configured to detect a thermal object image 110B in the thermal image 110M, detect a visible light object image 120B in the visible light image 120M, and determine that the foreign object 20 is detected when the thermal object image 110B and the visible light object image 120B are detected in the thermal image 110M and the visible light object image 120B respectively, such that each of the plurality of a set of cameras 310S is configured to scan one of the plurality of sectors 302S of the runway 302. As shown in FIG. 3, the runway 302 may be divided into a plurality of sectors 302S. Each of the plurality of sets of cameras 310S may scan one of the plurality of sectors 302S to detect any foreign object 20 on the surface of the respective sector 302S. Each of the plurality of sectors 302S may be further divided into a plurality of subsectors. Each set of cameras 310S may be operable to scan a dedicated sector 302S and scan the sector 302S, subsector by subsector. In this way, when a foreign object 20 is detected, the system 300 is able to identify the sector 302S based on the set of cameras 310S scanning the sector 302S. Set of cameras 310S may scan the sector 302S in a specific typical scan direction, e.g. from the left-most subsector to the right-most subsector or the right-most subsector to the left-most subsector.

Thermal camera 210 detects foreign object 20 on the runway 302 by detecting the difference in thermal radiation level (or temperature) between the foreground, i.e. foreign object 20, and the background, i.e. the runway surface. Thermal camera 210 operates in the infrared spectrum and does not require any ambient light to enable it to "see" the foreign object 20. Thermal camera 210 may also be commonly known as infrared thermal camera. Thermal camera 210 may be a Mid Wave Infrared (MWIR) camera or a Long Wave Infrared (LWIR) camera. Thermal camera 210 provides the advantage to detect the foreign object 20 on the runway 302 under very low visibility conditions and even under zero illumination conditions, i.e. total darkness. Hence, the thermal camera 210 provides the advantage of the ability to detect the foreign object 20 on the runway 302 even under foggy weather conditions. Thermal camera 210 may capture and transmit images and video output in monochrome to the processor 132. Thermal camera 210 is entirely passive with no active transmissions or emissions, e.g. radio frequency, microwave, artificial illumination, infrared, laser and LIDAR etc. As such, the thermal camera 210 offers the following advantages, e.g. no interference with existing airport systems/equipment and aircraft systems/equipment, no interference with future airport systems/equipment and aircraft systems/equipment, no licensing and approval of frequency/spectrum required from airport and frequency spectrum regulator.

Unlike the thermal camera 210, the visible light camera 220 operates within the visible spectrum of light and hence requires some minimum amount of ambient visible spectrum light to enable it to "see" the foreign object 20 on the runway 302. Visible light camera 220 is not able to detect any foreign object 20 when the visibility conditions are too poor or under zero illumination conditions. For example, the visible light camera 220 is also not able to detect the foreign object 20 when the visibility condition (above the runway surface) is very poor or in the presence of fog (above the runway surface). Visible light camera 220 is able to capture and transmit full colour and high-resolution images/video, e.g. Full HD (FHD) or 4K Ultra HD (4K UHD) resolution. The colour images in high resolution enables reliable and accurate visual verification and confirmation of the detected foreign object 20 by an operator, as well as reliable and accurate recognition/classification of the detected foreign object 20 by the system 300. Therefore, the combined use of both the visible light camera 220 and the thermal camera 210 enables the system 300 to operate under very low visibility conditions, e.g. foggy weather conditions, to enable the system 300 to detect foreign object 20 on the runway 302 surface accurately and reliably. Visible light camera 220 is configured to capture and output visible light image 120M in colour and high resolution to the processor 132. Visible light camera 220 does not require any transmission of infrared illumination, visible spectrum illumination or laser illumination to operate. Being passive, the system 300 provides the advantage that it does not pose any hazard or cause any interference to other airport systems and/or aircraft systems, e.g. for aircraft landing/taking-off from the runway 302. System 300 provides the following advantages, no interference with existing airport systems/equipment and aircraft systems/equipment, no interference with future airport systems/equipment and aircraft systems/equipment, no licensing and approval of frequency/spectrum required from airport and frequency spectrum regulator.

Figure 4:
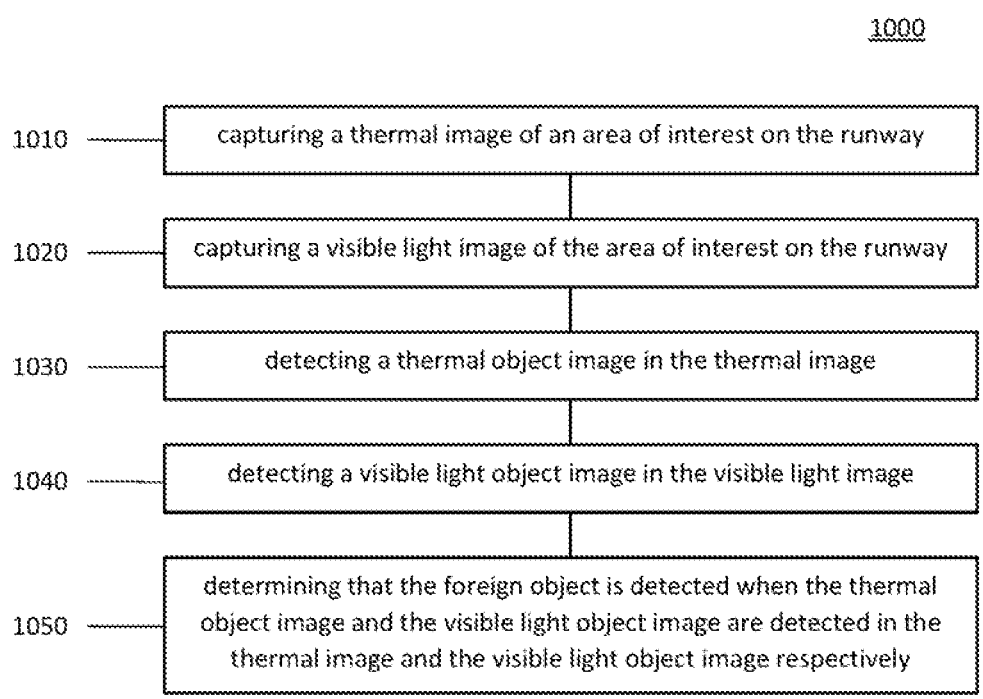
FIG. 4 shows a flow diagram of an exemplary method for detecting a foreign object on a runway.

FIG. 4 shows a flow diagram of an exemplary method 1000 for detecting a foreign object 20 on a runway. Method includes capturing a thermal image 110M of an area of interest 112 on the runway in block 1010, capturing a visible light image 120M of the area of interest 112 on the runway in block 1020, detecting a thermal object image 110B in the thermal image 110M in block 1030, detecting a visible light object image 120B in the visible light image 120M in block 1040, and determining that the foreign object 20 is detected when the thermal object image 110B and the visible light object image 120B are detected in the thermal image 110M and the visible light object image 120B respectively in block 1050. Thermal object image 110B may be a portion of the thermal image 110M representing the foreign object 20 in the thermal image 110M and may be casually known as the foreign object 20 in the thermal image 110M. Visible light object image 120B may be a portion of the visible light image 120M representing the foreign object 20 in the visible light image 120M and may be casually known as the foreign object 20 in the visible light image 120M.

Before capturing the thermal image 110M and visible light image 120M, the method may include scanning the runway with the thermal camera 110 and the visible light camera 120. As the thermal camera 110 and the visible light camera 120 scan a sector of the runway, the thermal camera 110 and the visible light camera 120 captures thermal images 110M and visible light images 120M of a plurality of area of interests 112 along the sector. To detect the foreign object 20, the image processing module 134M may process the thermal image 110M and the visible light image 120M to determine if the foreign object 20 is present in the thermal image 110M and the visible light image 120M. Upon detecting the foreign object 20, the image processing module 134M may be configured to identify the thermal object image 110B and the visible light object image 120B within the thermal image 110M and the visible light image 120M respectively. Upon identifying the foreign object 20, the system 100 may generate an alert signal.

To detect the foreign object 20, the method may include generating at least one attribute of the foreign object 20 in each of the thermal object image 110B and visible light object image 120B, comparing the at least one attribute of the foreign object 20 in the thermal object image 110B and the visible light object image 120B, such that the foreign object 20 is detected when the at least one attribute of the foreign object 20 in thermal object image 110B and the visible light object image 120B are the same or within a specified parameter or threshold level. System 100 may be configured to obtain an enlarged thermal object image 110B and an enlarged visible light object image 120B when the foreign object 20 is detected by zooming the visible light camera 120 and thermal camera 110 onto the detected foreign object 20.

Figure 5:
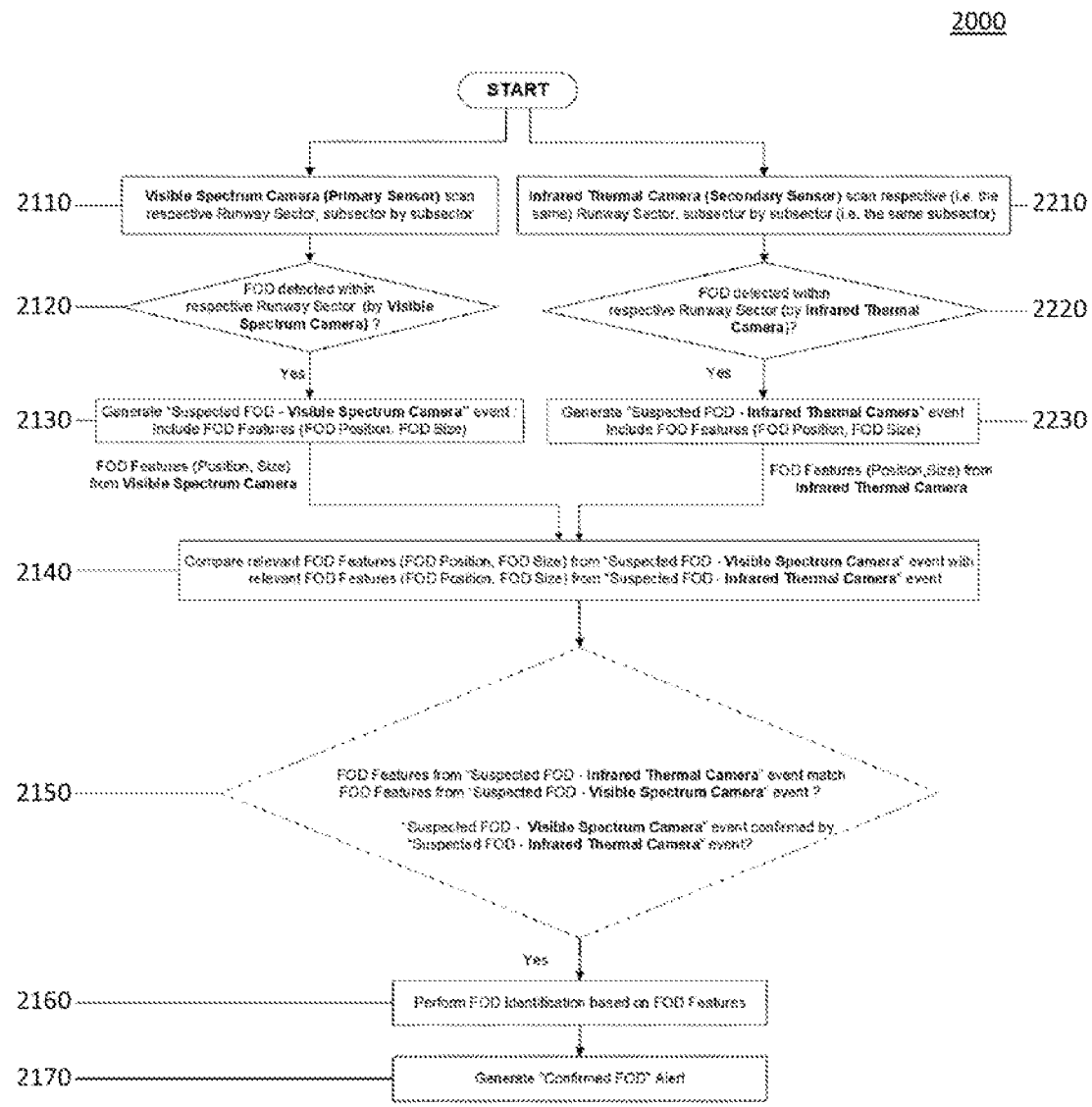
FIG. 5 shows a flow diagram of an exemplary method for detecting the foreign object on a runway.

FIG. 5 shows a flow diagram of an exemplary method 2000 for detecting the foreign object 20 on a runway. System 100 may be configured to designate the visible light camera 120 to be a primary detector and the thermal camera 110 to be a secondary detector. Referring to FIG. 5, in block 2110, the visible light camera 120 may be configured to scan one of the plurality of sectors on the runway. Visible light camera 120 may be configured to scan a subsector by subsector of the sector. Visible light camera 120 may capture a plurality of visible light images 120M within each sector. Plurality of visible light images 120M may be processed by the image processing module 134M to detect the foreign object 20. In block 2210, the thermal camera 110 may be configured to scan the same sector on the runway scanned by the visible light camera 120. Thermal camera 110 may be configured to scan a subsector by subsector of the sector. Thermal camera 110 may capture a plurality of thermal image 110Ms within the same sector. Plurality of thermal images 110M may be processed by the image processing module 134M to detect the foreign object 20. Thermal camera 110 and the visible light camera 120 may be configured to scan the sector concurrently. Image processing module 134M for the visible image and thermal image 110M may be separate modules for processing the visible light image 120M and thermal image 110M respectively.

In block 2120, the system 100 may detect a foreign object 20 after processing the visible light image 120M. System 100 may identify the visible light object image 120B within the visible image. In block 2220, the system 100 may detect a foreign object 20 after processing the thermal image 110M. System 100 may identify the thermal object image 110B within the thermal image 110M. Thermal image 110M and the visible light image 120M may be processed by the processor 132 concurrently. If the system 100 detects a foreign object 20 in the visible light image 120M, the system 100 may generate a "Suspected FOD" alert signal to inform the operator that a foreign object 20 has been detected in the visible light image 120M in block 2130. Similarly, if the system 100 detects a foreign object 20 in the thermal image 110M, the system 100 may generate a "Suspected FOD" alert signal to inform the operator that a foreign object 20 has been detected in the thermal image 110M in block 2230 as the detection of the foreign object 20 has yet to be verified. The "Suspected FOD" signal may be generated for each of the visible light image 120M and the thermal image 110M. System 100 may display the thermal object image 110B and/or the visible light object image 120B on the display for the operator to view. System 100 may generate at least one attribute of the visible light object image 120B and of the thermal object image 110B. At least one attribute may include the position of the visible light object image 120B in the visible light image 120M, the position of the thermal object image 110B in the thermal image 110M, the size of the visible light object image 120B and/or the size of the thermal object image 110B. For example, the system 100 may generate the position of the visible light object image 120B in the visible light image 120M and the position of the thermal object image 110B in the thermal image 110M and/or the size of the visible light object image 120B and thermal object image 110B. In block 2140, the system 100 may be configured to determine whether the foreign object 20 is detected in the visible light image 120M and the thermal image 110M by comparing the at least one attribute of the visible light object image 120B and the thermal object image 110B. Details of this comparing step may be shown in FIG. 7. If the attributes of the visible light object image 120B and the thermal object image 110B matches in block 2150, the system 100 determines that the foreign object 20 is detected in the visible light image 120M and the thermal image 110M. System 100 may receive an operator verification input via the peripheral interface module to verify the detection of the foreign object 20 after viewing the visible light image 120M and/or thermal image 110M on the display. System 100 may identify the foreign object 20 based on the at least one attributes in block 2160. Once the foreign object 20 has been detected and/or identified, the system 100 may generate an alert signal, e.g. a "Confirmed FOD" signal in block 2170. Otherwise, the system 100 may generate a "No Confirmed FOD" alert signal. System 100 may transmit the alert signal to an operator's mobile device or display the alert signal on the display for the operator's viewing. System 100 may generate the alert signal upon receiving the operator verification input that the foreign object 20 is detected.

Figure 6:
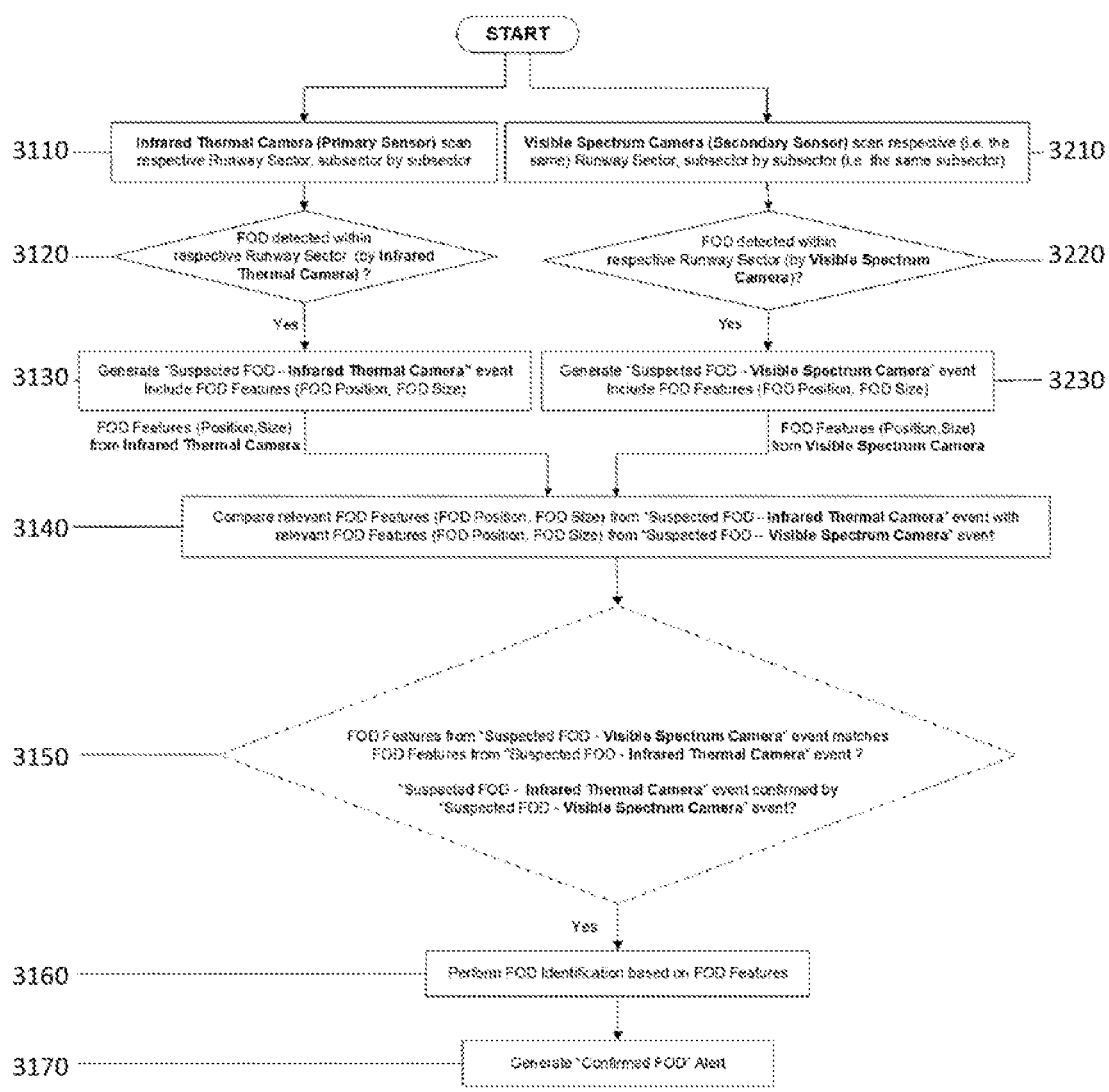
FIG. 6 shows a flow diagram of an exemplary method for detecting the foreign object on a runway.

FIG. 6 shows a flow diagram of an exemplary method 3000 for detecting the foreign object 20 on a runway. Method 3000 is identical to method 2000 in FIG. 5 except that the system 100 is configured to designate the thermal camera 110 to be a primary detector and the visible light camera 120 to be a secondary detector. Like reference numerals in FIG. 5 and FIG. 6 represent the same steps. Referring to FIG. 6, in block 3110, the thermal camera 110 may be configured to scan one of the plurality of sectors on the runway. Thermal camera 110 may be configured to scan a subsector by subsector of the sector. Thermal camera 110 may capture a plurality of thermal images 110M within each sector. Plurality of thermal images 110M may be processed by the image processing module 134M to detect the foreign object 20. In block 3210, the visible light camera 120 may be configured to scan the same sector on the runway scanned by the thermal camera 110. Visible light camera 120 may be configured to scan a subsector by subsector of the sector. Visible light camera 120 may capture a plurality of visible light images 120M within the sector. Plurality of visible light images 120M may be processed by the image processing module 134M to detect the foreign object 20. Thermal camera 110 and the visible light camera 120 may be configured to scan the sector concurrently. In block 3120, the system 100 may detect a foreign object 20 after processing the thermal image 110M. System 100 may identify the thermal object image 110B within the thermal image 110M. In block 3230, the system 100 may detect a foreign object 20 after processing the visible light image 120M. System 100 may identify the visible light object image 120B within the visible light image 120M. Thermal image 110M and the visible light image 120M may be processed by the processor 132 concurrently. Blocks 3140 to 3170 are identical to blocks 2140 to 2170 in FIG. 5.

Figure 7:
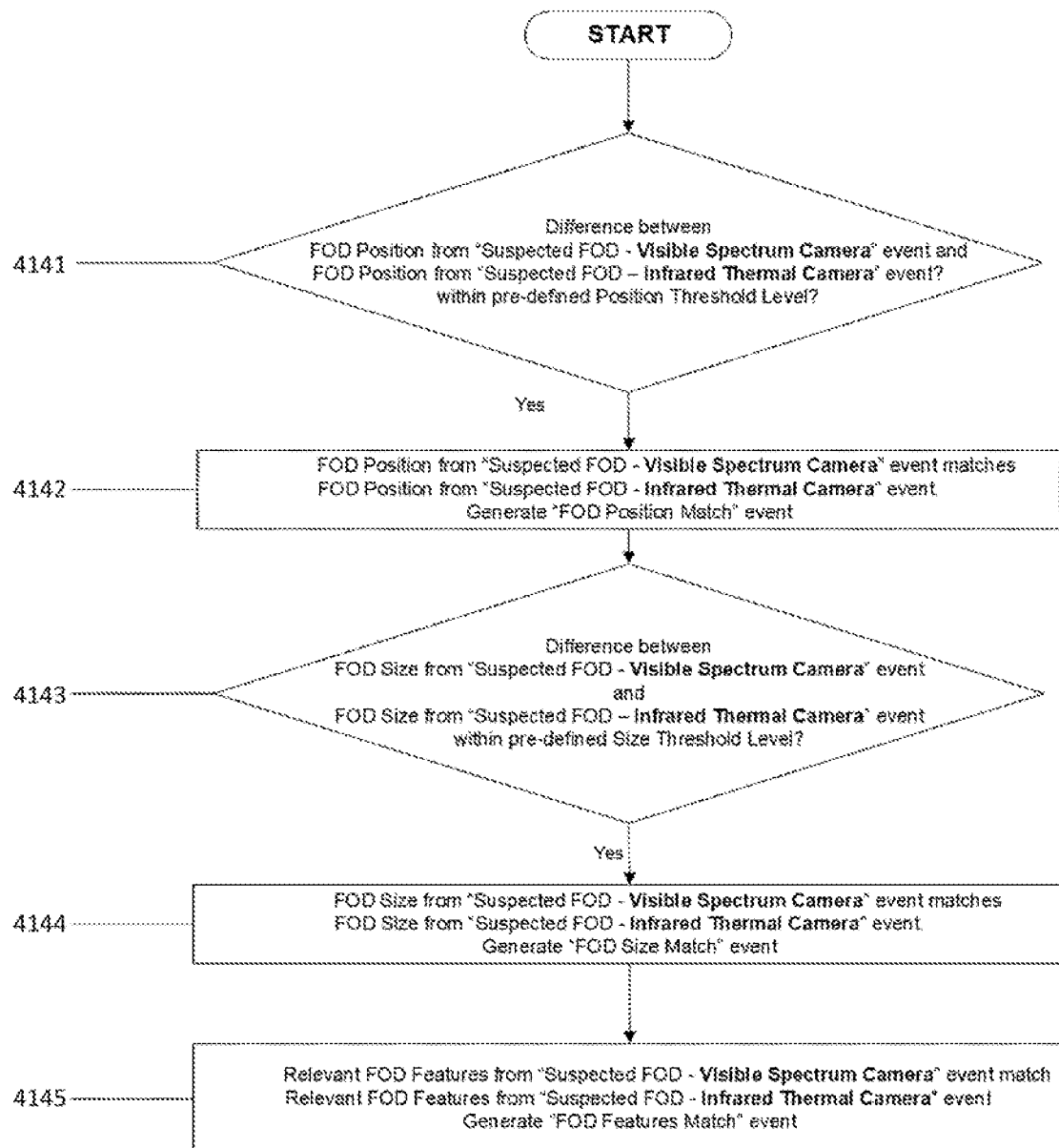
FIG. 7 shows a flow diagram of an exemplary method for comparing the at least one attribute of the foreign object in the thermal object image and the visible light object image.

FIG. 7 shows a flow diagram of an exemplary method 4140 for comparing the at least one attribute of the foreign object 20 in the thermal object image 110B and the visible light object image 120B. Method 4140 is used in method 2000 in FIG. 5 and method 3000 in FIG. 6 in block 2140 and block 3140 respectively. At least one attribute of the foreign object 20 may include the position of the thermal object image 110B in the thermal image 110M and the position of the visible light object image 120B in the visible light image 120M. In block 4141, the at least one attribute of the foreign object 20 in thermal object image 110B and the visible light object image 120B may be considered the same when the distance between the position of the thermal object image 110B in the thermal image 110M and the position of the visible light object image 120B in the visible light image 120M is within a position parameter. For example, the processor 132 identifies the positional difference between the positions of the visible light object image 120B and thermal object image 110B in the visible light image 120M and the thermal image 110M and determines if the positional difference between the positions are within a position parameter, i.e. a pre-defined position threshold level. Position parameter may be determined based on statistical analysis of the detected positions of all the detected foreign object 20 samples. If the positional difference is within the position parameter, the processor 132 may generate a "position match" alert signal in block 4142.

At least one attribute of the foreign object 20 may include the size of the thermal object image 110B and visible light object image 120B. In block 4143, the at least one attribute of the foreign object 20 in the thermal object image 110B and visible light object image 120B may be considered the same when the difference in the size of the thermal object image 110B in the thermal image 110M and the size of the visible light object image 120B in the visible light image 120M is within a size parameter. For example, the processor 132 identifies the size difference between the sizes of the visible light object image 120B and thermal object image 110B in the visible light image 120M and the thermal image 110M and determines if the size difference between the positions are within a size parameter, i.e. a pre-defined size threshold level. Size parameter may be determined based on statistical analysis of the measured sizes of all the detected foreign object 20 samples. If the size difference is within the size parameter, the processor 132 may generate a "size match" alert signal in block 4144.

Depending on the configuration of the system 100, the process may detect the foreign object 20 based on the position and/or size of the thermal object image 110B and visible light object image 120B. For example, where both the position and size of the thermal object image 110B and the visible light object image 120B are used, the foreign object 20 is detected when the position and size of the thermal object image 110B and visible light object image 120B are within the position parameter and size parameter respectively, i.e. matched. System 100 may generate an alert signal when the foreign object 20 is detected, e.g. generate an "attribute match" signal when the attributes are matched in block 4145. System 100 may generate the alert signal when the "position match" alert signal and "size match" alert signal is on or generated.

The exemplary system 100 and methods described above provide a solution that enables the detection of a foreign object 20 during adverse weather conditions and prevent or minimise false detection of the foreign object 20. For example, the reflections from water puddles or ponding after a rainfall, or the reflections on a smooth runway surface occur within the visible spectrum of light. As, the visible light camera 120 operates solely within the visible light spectrum, the system 100 may easily misinterpret these reflections as foreign objects 20, or "Suspected FOD". This would cause the system 100 to generate an invalid alert or false positive alarms. Therefore, by comparing and detecting the foreign object 20 using both the thermal image 110M and visible light image 120M, the system 100 is able to provide a more accurate detection of the foreign object 20 and prevent or minimise false detection of the foreign object 20.

Referring to the method 2000 in FIG. 5 and method 3000 in FIG. 6. When comparing the at least one attribute of the visible light object image 120B and the thermal object image 110B, the system 100 may determine that the detection of the foreign object 20 is not confirmed, i.e. the at least one attribute in the visible light object image 120B does not match the at least one attribute in the thermal image 110M. System 100 may then generate a "No Confirmed FOD" alert signal. In this situation, as the system 100 "suspected" that a foreign object 20 is detected, but identified that it is not "confirmed", the system 100 may be configured to identify this event as an invalid alert or false positive alert. Hence, the system 100 may be configured to store at least one of: the alert signal, attributes, features and the images of this event into a database, e.g. invalid alert database, for post-mortem analysis and investigation.

Figure 8:
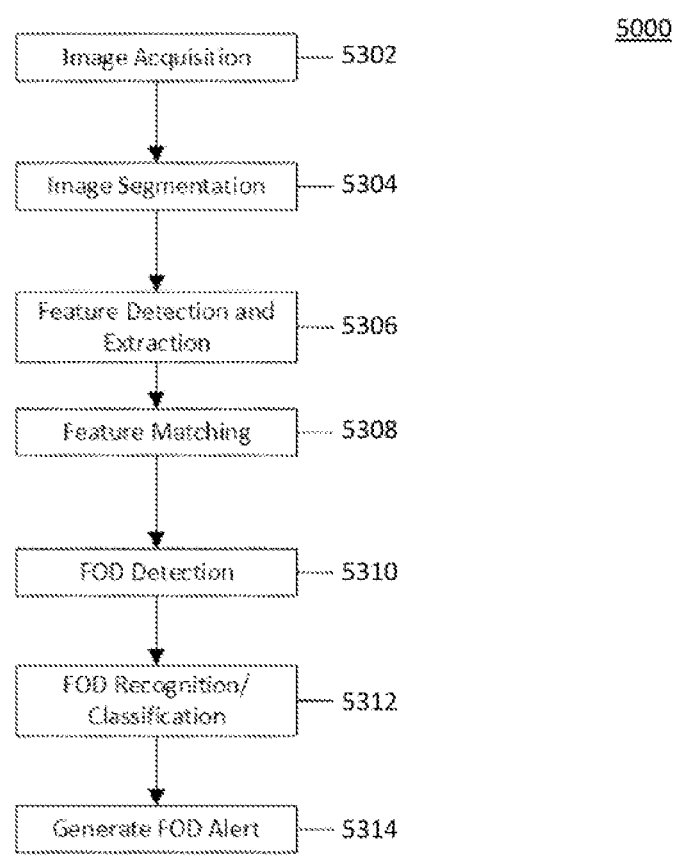
FIG. 8 shows a flow diagram of a method for identifying a foreign object on the runway.

FIG. 8 shows a flow diagram of a method 5000 for identifying a foreign object 20 on the runway. Image processing module 134M may be configured to carry out the method 5000. System 100 may store a plurality of reference feature vectors and an object category associated with each of the plurality of reference feature vectors in a reference feature vector database, which may be stored in the storage device 140. To identify the foreign object 20, the system 100 is configured to identify the object category of the foreign object 20. Referring to FIG. 8, the method may include capturing the visible light image 120M and the thermal image 110M via the visible light camera 120 and the thermal camera 110 in block 5302. To identify an object category of the foreign object 20 in the thermal image 110M, the method includes segmenting the thermal image 110M into a plurality of thermal image regions in block 5304. Method may include segmenting the visible light image 120M into a plurality of visible light image regions in block 5304.

Segmenting the thermal image 110M may include labelling each pixel in the thermal image 110M and grouping the labelled pixels with the same characteristic into a plurality of groups to form the plurality of thermal image regions. Segmenting the visible light image 120M may include labelling each pixel in the visible light image 120M and grouping the labelled pixels with the same characteristic into a plurality of groups to form the plurality of visible light image regions. Processor 132 may be configured to assign a label to each pixel in the thermal image 110M and visible light image 120M such that the pixels with the same label share certain common characteristics or properties. Upon segmentation, the thermal image 110M and the visible light image 120M are made up of a plurality of thermal image regions and a plurality of visible light image regions that collectively cover the respective images. The pixels within each of the plurality of regions are similar with respect to some characteristic, feature or property, such as texture, colour, or intensity. Adjacent regions of the plurality of image regions are significantly different from each other with respect to the same characteristic. The segmented thermal image 110M and visible light image 120M may be used to detect and locate region or regions which may include the suspected foreign object 20 in the images. In block 5306, the method may include detecting and extracting features from the thermal image 110M and visible light image 120M. System 100 may be configured to assign a feature vector to each of the plurality of thermal image regions, e.g. thermal feature vector, and each of the plurality of visible light image regions, e.g. visible light feature vector. A feature may refer to a pattern or distinct structure found in an image, such as a point, blob, small patch, corner, edge. Features are represented by an image region which differs from the image regions in its immediate surroundings, e.g. by texture, colour or intensity. Features may be extracted, grouped and represented by the feature vector. A foreign object 20 may be represented by a group of features, which may be represented by a feature vector.

In block 5308, the method may include comparing the feature vector to the plurality of reference feature vectors, such that each of the plurality of reference feature vectors is associated to an object category. System 100 may match the feature vector to the plurality of reference feature vectors in block 5308. Each object category, e.g. rubber tire, mechanic's tool, aircraft part, vehicle part etc., may be represented by a specific reference feature vector stored in the reference feature vector database. Each extracted feature vector may be matched against the plurality of reference feature vectors in the reference feature vector database. In block 5310, the method may include detecting the foreign object 20. If there is a match between the feature vector and one or more of the plurality of reference feature vectors, the system 100 may determine that a foreign object 20 is detected. System 100 may generate a "Suspected FOD" alert signal. In block 2312, the method may include identifying the object category of the foreign object 20. System 100 may be configured to identify the reference feature vector closest to the feature vector and its object category. Based on the matched one or more of the plurality of reference feature vectors, the system 100 may identify or classify the foreign object 20 based on the closest match between the feature vector and the one or more of the plurality of reference feature vectors, e.g. the "shortest distance" between the feature vector and the specific reference feature vector. In addition, the "shortest distance" may be used to determine the match or probability of the foreign object 20 being classified accurately. There could potentially be more than one reference feature vector which may match the feature vector. The matching may be based on fuzzy matching. System 100 may be configured to recognise and classify the foreign object 20 based on the object category. System 100 may identify an object category of the foreign object 20 in the visible light image 120M. Based on the matched reference feature vector, the object category tagged to the matched reference feature vector may be retrieved and the foreign object 20 may be identified or classified. Upon identifying the foreign object 20, the system 100 may generate and transmit an alert signal.

Figure 9:
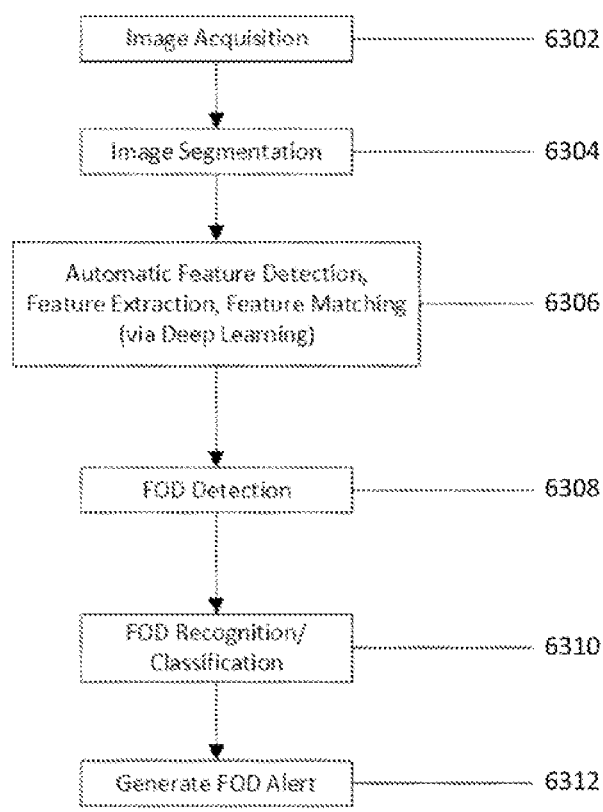
FIG. 9 shows a flow diagram of a method for identifying a foreign object on the runway.

FIG. 9 shows a flow diagram of a method 6000 for identifying a foreign object 20 on the runway. Method 6000 is identical to method 5000 in FIG. 8 except that the system 100 is configured to automatically detect and extract the features from the thermal image 110M and visible light image 120M, match the feature vector to the plurality of reference feature vectors and detecting the foreign object 20 in block 6306. Like reference numerals in FIG. 8 and FIG. 9 represent the same steps. System 100 may be configured to train the image processing module 134M using deep learning modules and automatically carry out the steps in block 6306.

Thermal camera 110 is able to detect foreign objects 20 by detecting the difference in the temperature, i.e. the infrared thermal radiation of the foreground, e.g. the foreign object 20, with respect to the background, e.g. the runway 202 surface. Different categories or types of foreign objects 20 are made of different materials, e.g. metallic, rubber, plastic, concrete, etc., and would have different energy absorptivity, reflectivity and emissivity. As such, different categories of foreign objects 20 would result in different temperature, i.e. different level of infrared thermal radiation with respect to the background, i.e. the runway surface. The difference in temperature between the foreign object 20 and the runway would be detectable by the thermal camera 110.

Therefore, it is beneficial to "train" the thermal camera 110, or rather the thermal camera operating module 134T, to differentiate the different categories of foreign objects 20 by identifying the type of material which the foreign object 20 is made of, e.g. rubber, metallic, plastic, concrete, asphalt, etc. As foreign objects 20 made of the different types of materials would have different emissivity resulting in different level of temperature and different temperature contrast level with respect to the background, i.e. the runway, the "well-trained" thermal camera 110 would be able to identify a foreign object 20 more accurately.

To train the thermal camera 110. Under normal clear weather conditions, the thermal camera 110 may be put through an initial period of "training" whereby the thermal camera 110 may operate in "training" mode to enable it to "learn" from the visible light images 120M of the visible light camera 120. After the initial "training", the thermal camera 110 may be adequately "learned" to enable the thermal camera 110 to provide reliable and accurate foreign object 20 detection with relatively high level of accuracy. With a high level of accuracy, it would then be possible to enable a system 100 with a "standalone" thermal camera 110 instead of a set of visible light camera 120 and thermal camera 110. In this way, the system 100 will be applicable under adverse weather conditions and/or very low visibility conditions without the visible light camera 120.

Figure 10:
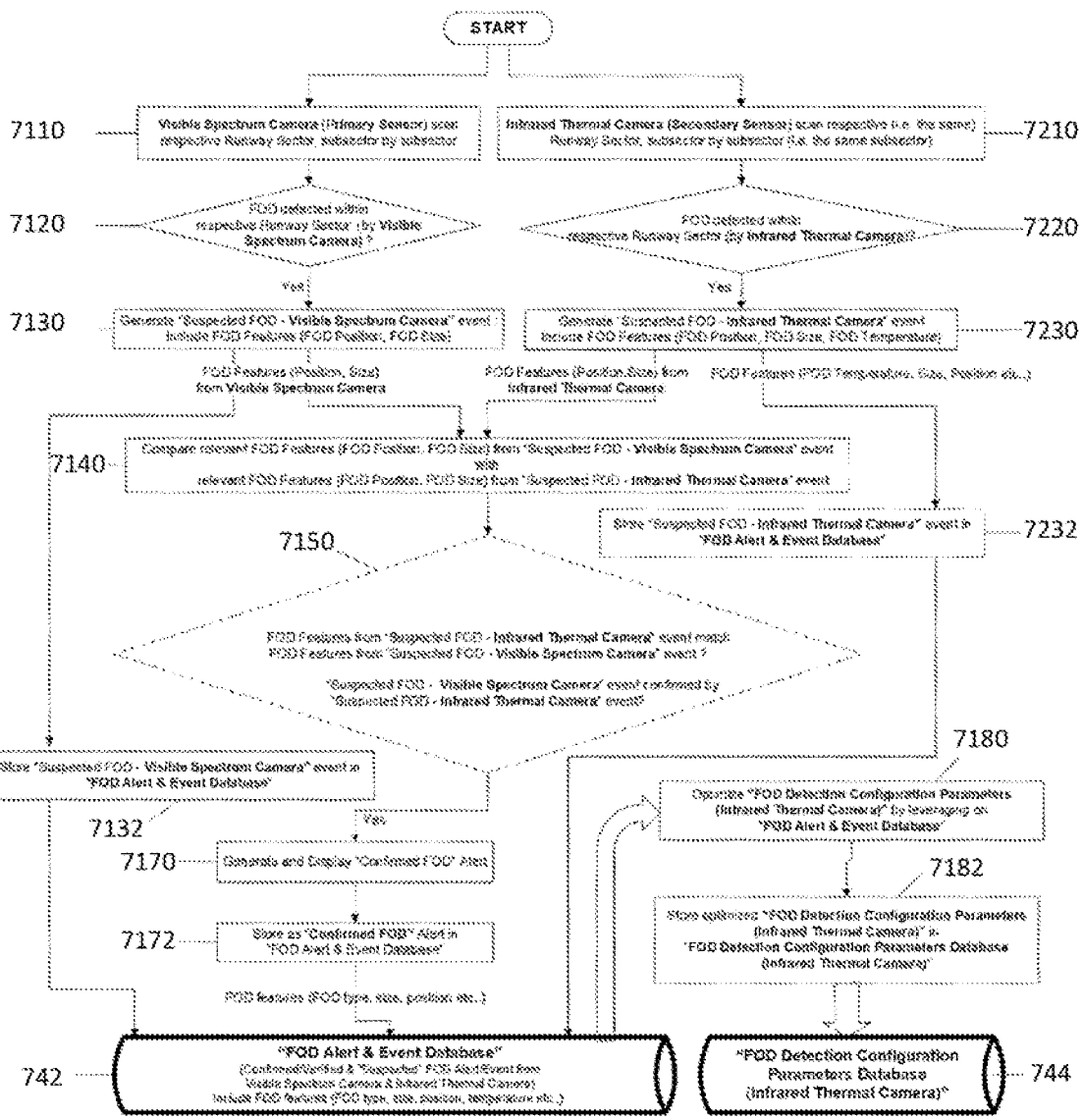
FIG. 10 shows a flow diagram of a method for training the image identification module to improve the identification of a foreign object on the runway.

FIG. 10 shows a flow diagram of a method for training the image processing module 134M to improve the identification of a foreign object 20 on runway. In block 7110, the visible light camera 120 may be configured to scan one of the plurality of sectors on the runway. Visible light camera 120 may be configured to scan a subsector by subsector of the sector. Visible light camera 120 may capture a plurality of visible light images 120M of the sector. Plurality of visible light images 120M may be processed by the image processing module 134M to detect the foreign object 20. In block 7210, the thermal camera 110 may be configured to scan the same sector on the runway scanned by the visible light camera 120. Thermal camera 110 may be configured to scan a subsector by subsector of the sector. Thermal camera 110 may capture a plurality of thermal images 110M of the sector.

Plurality of thermal images 110M may be processed by the image processing module 134M to detect the foreign object 20. Thermal camera 110 and the visible light camera 120 may be configured to scan the sector concurrently. In block 7120, the system 100 may detect a foreign object 20 after processing the visible light image 120M and identify the visible light object image 120B. In block 7220, the system 100 may detect a foreign object 20 after processing the thermal image 110M and identify the thermal object image 110B. Thermal image 110M and the visible light image 120M may be processed by the processor 132 concurrently. If the system 100 detects a foreign object 20 in the visible light image 120M, the system 100 may generate a "Suspected FOD" alert signal to inform the operator that a foreign object 20 has been detected in the visible light image 120M. Similarly, if the system 100 detects a foreign object 20 in the thermal image 110M, the system 100 may generate a "Suspected FOD" signal to inform the operator that a foreign object 20 has been detected in the thermal image 110M in block 7230 as the detection of the foreign object 20 has yet to be verified. The "Suspected FOD" alert signal may be generated for each of the visible light image 120M and the thermal image 110M. System 100 may display the thermal object image 110B and/or the visible light object image 120B on the display for the operator to view. System 100 may generate at least one attribute of the visible light object image 120B in block 7130 and generate at least one attribute of the thermal object image 110B in block 7230.

At least one attribute may include the position of the visible light object image 120B in the visible light image 120M, the position of the thermal object image 110B in the thermal image 110M, the size of the visible light object image 120B, the size of the thermal object image 110B and/or the temperature of the thermal object image 110B. For example, the system 100 may generate the position of the visible light object image 120B in the visible light image 120M and/or the size of the visible light object image 120B. For example, the system 100 may generate at least one of the position of the thermal object image 110B in the thermal image 110M, the size of the thermal object image 110B and the temperature of the foreign object 20. System 100 may be configured to store at least one of: the alert signal, attributes, features and the images of this event into the foreign object alert signal and event database 742 in block 7132 and block 7232. In block 7140, the system 100 may be configured to determine whether the foreign object 20 is present in the visible light image 120M and the thermal image 110M by comparing the at least one attribute of the visible light object image 120B and the thermal object image 110B. The method of comparing the at least one attribute may be shown in method 4140 in FIG. 7. If the attributes of the visible light object image 120B and the thermal object image 110B matches in block 7150, the system 100 determines that the foreign object 20 is detected in the visible light image 120M and the thermal image 110M. If the foreign object 20 has been detected, the system 100 may generate and display an alert signal, e.g. a "Confirmed FOD" alert signal in block 7170. Otherwise, the system 100 may generate and transmit a "No Confirmed FOD" alert signal. System 100 may be configured to store at least one of: the signal, attributes, features and the images into the foreign object alert signal and event database 742 in block 7172. In block 7180, the system 100 may be configured to optimize detection configuration parameters of the thermal camera 110. System 100 may optimize the detection configuration parameters based on the data stored in the foreign object alert signal and event database 742. System 100 may run statistical analysis and/or optimization modules to optimise the detection configuration parameters based on the data. System 100 may use artificial intelligence to optimize the detection configuration parameters based on the data. In block 7182, the system 100 may be configured to store the optimized detection configuration parameters of the thermal camera 110 in a foreign object 20 detection configuration parameters database 744 for the thermal camera 110.

System 100 may determine the relationship between the object category and the temperature of the foreign object 20 in the thermal image 110M for all the detected/verified foreign object samples. Processor 132 may be further configured to train the thermal camera 110 to detect the foreign object 20 based on the visible light images 120M from the visible light camera 120. As it is substantially easier to identify and categorise a foreign object 20 in visible light image 120M, the system 100 may form a relationship between the object category of the visible light object image 120B obtained from the visible light camera 120 and the temperature of the thermal object image 110B from the thermal camera 110. Hence, with a sufficiently large foreign object sample size, the system 100 would be able to determine the relationship between different foreign object categories, e.g. foreign object made of different materials, such as metal, plastic, rubber, etc. and their corresponding temperatures. System 100 may then be able to build an "FOD Type Thermal Profile Model" which could be used to map the various foreign object types, i.e. made of different materials, to their corresponding temperature ranges. In this way, the system may be able to identify the foreign object 20 more easily based on the thermal object image 110B thereof.

The "FOD Type Thermal Profile Model" would enable the system 100 to determine the foreign object category or type, including the specific type of material which the foreign object 20 is made of, such as metal, rubber, plastic, etc. of any detected foreign object 20 based on the temperature of the foreign object 20 detected by the thermal camera 110. The development of the "FOD Type Thermal Profile Model" may be based on mathematical methods and/or statistically methods, such as statistical correlation analysis. Alternatively, the development of the "FOD Type Thermal Profile Model" may be based on artificial intelligence and machine learning technologies. This "FOD Type Thermal Profile Model" may be used to optimize the detection configuration parameters of the thermal camera 110.

To optimize the performance of the thermal camera 110, it is necessary to optimize the detection configuration parameters of the thermal camera 110. The detection configuration parameters of the thermal camera 110 may be a set of operating parameters pertaining to the thermal camera 110 to enable the thermal camera 110 to detect foreign objects 20 with optimum and high level of accuracy. Operating parameters of the thermal camera 110 may include sensitivity, gain, brightness, contrast, shutter timing settings, etc. In this way, as the system 100 trains the thermal camera operating module 134T, the detection performance of the thermal camera 110 would be improved over time to a level at which it may be able to operate as "standalone" and sole foreign object detector for the system 100, i.e. without the visible light camera 120. The optimized performance thermal camera 110 would be beneficial under adverse weather conditions and/or under very low visibility conditions.

The various temperature contrast levels due to different types of foreign object materials may be detected by the thermal camera 110. This would enable the thermal camera 110 to detect a foreign object 20 accurately. This may also enable the system 100 to classify or recognise the different categories or types of foreign object 20 based on the different types of materials which the foreign object 20 is made of.

Database 742 may contain the alert signals, e.g. "Suspected FOD", "Confirmed FOD" and events that took place in the methods for both the visible light camera 120 and the thermal camera 110. Database 742 may store the detected and/or computed foreign object 20 attributes, e.g. category, size, position, temperature etc.

Figure 11:
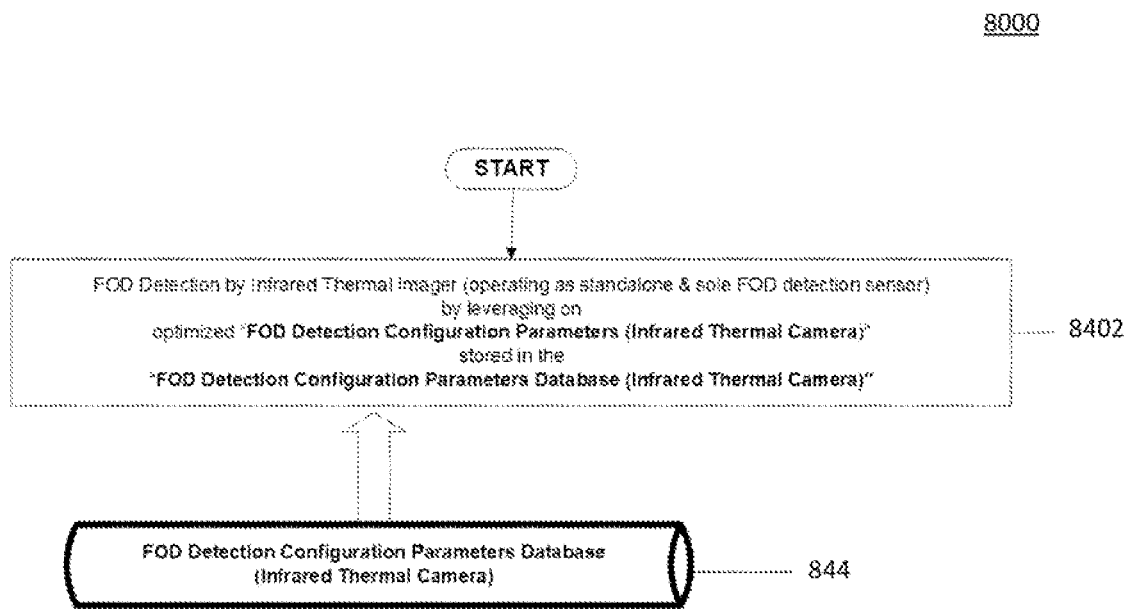
FIG. 11 shows a flow diagram of a method for detecting a foreign object with a thermal camera.

FIG. 11 shows a flow diagram of a method 8000 for detecting a foreign object 20 with a thermal camera 110. After the "training", the thermal camera 110 may be able to provide reliable and accurate foreign object 20 detection with relatively high level of accuracy. With a high level of accuracy, it would then be possible for the thermal camera 110 to be used without the visible light camera 120. Referring to FIG. 11, the system 100 may be configured to detect a foreign object 20 by leveraging on optimized detection configuration parameters for the thermal camera 110 stored in the detection configuration parameters database 844 for the thermal camera 110 in block 8402. Thermal camera 110 may be configured as the sole foreign object detector to detect a foreign object 20.

A skilled person would appreciate that the features described in one example may not be restricted to that example and may be combined with any one of the other examples.

The present invention relates to a system 100, a detection system 100 for detecting a foreign object on a runway and a method of the system 100 generally as herein described, with reference to and/or illustrated in the accompanying drawings.

The invention claimed is:

1. A method for identifying a foreign object on a runway based on a thermal object image of the foreign object, the method comprising:
   capturing a thermal image of an area of interest on the runway,
   capturing a visible light image of the area of interest on the runway,
   detecting a thermal object image in the thermal image,
   detecting a visible light object image in the visible light image,
   determining that the foreign object is detected when the thermal object image and the visible light object image are detected in the thermal image and the visible light object image respectively,
   identifying and categorizing the visible light object image into an object category of the foreign object,
   determining a relationship between the object category of the foreign object in the visible light image and the thermal object image of the foreign object,
      wherein when a thermal object image of the foreign object is detected, the foreign object is identified by mapping the object category to the thermal object image based on the relationship.

2. The method according to claim 1, wherein determining the foreign object comprises generating at least one attribute of the foreign object in each of the thermal object image and visible light object image, comparing the at least one attribute of the foreign object in the thermal object image and the visible light object image, wherein the foreign object is detected when the at least one attribute of the foreign object in thermal object image and the visible light object image are the same.

3. The method according to claim 2, wherein the at least one attribute of the foreign object comprises the position of the thermal object image in the thermal image and the position of the visible light object image in the visible light image.

4. The method according to claim 3, wherein the at least one attribute of the foreign object in thermal object image and the visible light object image are the same when the distance between the position of the thermal object image in the thermal image and the position of the visible light object image in the visible light image is within a position parameter.

5. The method according to claim 2, wherein the at least one attribute of the foreign object comprises the size of the thermal object image and visible light object image.

6. The method according to claim 5, wherein the at least one attribute of the foreign object in the thermal object image and visible light object image are the same when the difference in the size of the thermal object image in the thermal image and the size of the visible light object image in the visible light image is within a size parameter.

7. The method according to claim 1, further comprising identifying an object category of the foreign object in the thermal image, wherein identifying the object category comprises,
   segmenting the thermal image into a plurality of thermal image regions,
   assigning a feature vector to each of the plurality of thermal image regions,
   comparing the feature vector to a plurality of reference feature vectors,
      wherein each of the plurality of reference feature vectors represents an object category,
      identifying the reference feature vector closest to the feature vector and its object category.

8. The method according to claim 7, wherein segmenting the thermal image comprises labelling each pixel in the thermal image and grouping the labelled pixels with the same characteristic into a plurality of groups to form the plurality of thermal image regions.

9. The method according to claim 1, wherein identifying the object category comprises,
   segmenting the visible light image into a plurality of visible light image regions,
   assigning a feature vector to each of the plurality of visible light image regions,
   comparing the feature vector to a plurality of reference feature vectors, wherein each of the plurality of reference feature vectors represents an object category, and
   identifying the reference feature vector closest to the feature vector and its object category.

10. The method according to claim 9, wherein segmenting the visible light image comprises labelling each pixel in the visible light image and grouping the labelled pixels with the same characteristic into a plurality of groups to form the plurality of visible light image regions.

11. The method according to claim 1, further comprising generating a thermal profile model of the foreign object based on the relationship and optimizing the detection configuration parameters of the thermal camera based on the thermal profile model.

12. A detection system for identifying a foreign object on a runway based on a thermal object image of the foreign object, the system comprising:
   a thermal camera comprising a first field of view and adapted to capture a thermal image of an area of interest on the runway,
   a visible light camera comprising a second field of view and adapted to capture a visible light image of the area of interest on the runway, wherein the first field of view overlaps the second field of view,
   a processor in communication with the thermal camera and the visible light camera,
   a memory in communication with the processor for storing instructions executable by the processor, wherein the processor is configured to,
      detect a thermal object image in the thermal image,
      detect a visible light object image in the visible light image,
      determine that the foreign object is detected when the thermal object image and the visible light object image are detected in the thermal image and the visible light object image respectively
      identify and categorizing the visible light object image into an object category of the foreign object,
      determine a relationship between the object category of the foreign object in the visible light image and the thermal object image of the foreign object,
         wherein when a thermal object image of the foreign object is detected, the foreign object is identified by mapping the object category to the thermal object image based on the relationship.

13. The detection system according to claim 12, wherein to determine the foreign object, the processor is configured to generate at least one attribute of the foreign object in each of the thermal object image and visible light object image, compare the at least one attribute of the foreign object in the thermal object image and the visible light object image, wherein the foreign object is detected when the at least one attribute of the foreign object in thermal object image and the visible light object image are the same.

14. The detection system according to claim 13, wherein the at least one attribute of the foreign object comprises the position of the thermal object image in the thermal image and the position of the visible light object image in the visible light image.

15. The detection system according to claim 14, wherein the at least one attribute of the foreign object in thermal object image and the visible light object image are the same when the distance between the position of the thermal object image in the thermal image and the position of the visible light object image in the visible light image is within a position parameter.

16. The detection system according to claim 13, wherein the at least one attribute of the foreign object comprises the size of the thermal object image and visible light object image.

17. The detection system according to claim 16, wherein the at least one attribute of the foreign object in the thermal object image and visible light object image are the same when the difference in the size of the thermal object image in the thermal image and the size of the visible light object image in the visible light image is within a size parameter.

18. The detection system according to claim 12, wherein the processor is configured to identify an object category of the foreign object in the thermal image, wherein the processor is configured to,
   segment the thermal image into a plurality of thermal image regions,
   assign a feature vector to each of the plurality of thermal image regions,
   compare the feature vector to a plurality of reference feature vectors,
      wherein each of the plurality of reference feature vectors represents an object category,
      identify the reference feature vector closest to the feature vector and its object category.

19. The detection system according to claim 18, wherein to segment the thermal image, the processor is configured to label each pixel in the thermal image and group the labelled pixels with the same characteristic into a plurality of groups to form the plurality of thermal image regions.

20. The detection system according to claim 12, wherein to identify an object category of the foreign object in the visible light image, the processor is configured to,
   segment the visible light image into a plurality of visible light image regions,
   assign a feature vector to each of the plurality of visible light image regions,
   compare the feature vector to a plurality of reference feature vectors,
      wherein each of the plurality of reference feature vectors represents an object category,
      identify the reference feature vector closest to the feature vector and its object category.

21. The detection system according to claim 20, wherein to segment the visible light image, the processor is configured to label each pixel in the visible light image and group the labelled pixels with the same characteristic into a plurality of groups to form the plurality of visible light image regions.

22. The detection system according to claim 12, wherein the process is further configured to generate a thermal profile model of the foreign object and optimizing the detection configuration parameters of the thermal camera based on the thermal profile model.

23. A system for detecting a foreign object on a runway divided into a plurality of sectors, the detection system comprising:
   a plurality of sets of cameras spaced apart from each other, each of the plurality of sets of cameras comprises:
      a thermal camera comprising a first field of view and adapted to capture a thermal image of an area of interest on the runway,
      a visible light camera comprising a second field of view and adapted to capture a visible light image of the area of interest on the runway, wherein the first field of view overlaps the second field of view,
   a processor in communication with the plurality of sets of cameras,
   a memory in communication with the processor for storing instructions executable by the processor, wherein the processor is configured to:
      detect a thermal object image in the thermal image,
      detect a visible light object image in the visible light image, and
      determine that the foreign object is detected when the thermal object image and the visible light object image are detected in the thermal image and the visible light object image respectively, identify and categorizing the visible light object image into an object category of the foreign object, determine a relationship between the object category of the foreign object in the visible light image and the thermal object image of the foreign object, wherein when a thermal object image of the foreign object is detected, the foreign object is identified by mapping the object category to the thermal object image based on the relationship, wherein each of the plurality of sets of cameras is configured to scan one of the plurality of sectors of the runway.

* * * * *